Nov. 13, 1956 N. A. SCHUSTER 2,770,771
WELL LOGGING METHODS AND APPARATUS
Filed June 6, 1952 4 Sheets-Sheet 1

INVENTOR.
NICK A. SCHUSTER
BY
Campbell, Brumbaugh, Free & Graves
HIS ATTORNEYS

Nov. 13, 1956    N. A. SCHUSTER    2,770,771
WELL LOGGING METHODS AND APPARATUS
Filed June 6, 1952    4 Sheets-Sheet 2

Fig. 2

INVENTOR.
NICK A. SCHUSTER
BY
Campbell, Brumbaugh, Free & Graves
HIS ATTORNEYS

Nov. 13, 1956 N. A. SCHUSTER 2,770,771
WELL LOGGING METHODS AND APPARATUS
Filed June 6, 1952 4 Sheets-Sheet 3

INVENTOR.
NICK A. SCHUSTER
BY
Campbell, Brumbaugh, Free & Graves
HIS ATTORNEYS

United States Patent Office 2,770,771
Patented Nov. 13, 1956

2,770,771

WELL LOGGING METHODS AND APPARATUS

Nick A. Schuster, Houston, Tex., assignor to Schlumberger Well Surveying Corporation, Houston, Tex., a corporation of Delaware Application June 6, 1952, Serial No. 292,073

14 Claims. (Cl. 324—1)

The present invention relates to well logging methods and apparatus and, more particularly, to novel methods and apparatus for obtaining indications of the electrical resistivity of formations traversed by a borehole containing conductive drilling liquid.

Conventional electrical resistivity logging methods of the types disclosed in prior United States Patents No. 1,819,923 and No. 1,894,328 granted to Conrad Schlumberger are widely used with great success for correlating formations traversed by one borehole with the same formations traversed by other boreholes, and for estimating the actual resistivities of formation material surrounding a borehole from the apparent resistivity indications obtained.

Henri-Georges Doll has disclosed in copending application Serial No. 161,641, entitled "Electrical Resistivity Well Logging Method and Apparatus" and filed May 12, 1950, now U. S. Patent No. 2,712,627, issued July 5, 1955; application Serial No. 211,788, entitled "Electrical Logging Apparatus" filed February 19, 1951, now U. S. Patent No. 2,712,628, issued July 5, 1955; application Serial No. 214,273, entitled "Electrical Logging of Earth Formations Traversed by a Borehole," filed March 7, 1951, now U. S. Patent No. 2,712,629, issued July 5, 1955; and application Serial No. 257,348, entitled "Methods and Apparatus for Electrical Logging of Wells" and filed November 20, 1951, now U. S. Patent No. 2,712,630, issued July 5, 1955, highly effective methods and apparatus for obtaining even more detailed electrical resistivity logs. These logs are more accurately indicative of the actual resistivities sought to be measured, as for example, the true formation resistivities or the resistivity of the zones in permeable formations invaded by filtrate from the drilling liquid. Each of these novel methods and apparatus confines the current emitted by a principal electrode passing through a borehole to a predetermined path through the formation material whereby potential measurements made in the vicinity of the principal electrode are indicative of the resistivity of the formation material in the predetermined path. The shape of this path is predetermined and maintained substantially constant during a logging operation by emitting an auxiliary current in the vicinity of said principal current electrode and controlling the amplitude and phase or polarity of the auxiliary current in accordance with potential differences created in the drilling liquid by the flow of the principal current.

It is a primary object of the present invention to provide novel methods and apparatus for obtaining indications of the resistivities of formation material in a predetermined path without confining a current to this path.

This and other objects of the invention are attained by emitting in the borehole at least two currents of such distinct character that potential differences created by the flow of one of the two currents may be readily separated, e. g. by frequency or time discrimination, from potential differences created by the flow of the other of the currents. At least two distinct potential differences created by the flow of each current are fed into a computer which automatically combines these potential differences, of which there are at least four, to give an indication of the resistivity of formation material in a predetermined path. The novel logging methods and apparatus of the present invention may, for example, be employed in conjunction with any of the electrode arrays disclosed in the aforementioned applications, and the resistivity indications obtained will be substantially the same as if current were forced along the particular path predetermined in accordance with disclosure of each patent application.

In a particular embodiment of the invention an electrode array adapted for passage through a borehole is provided having a first current-emitting electrode separated by two intermediate potential measuring electrodes from a second current-emitting electrode. The first electrode is supplied a current having preferably but not necessarily a constant intensity, and the second electrode is supplied an auxiliary current having a different frequency or time occurrence from that of the primary current in order that potential differences caused by it may be separated from potential differences caused by the primary current. The relative potentials between the two intermediate electrodes caused by the primary and auxiliary currents are separately measured. Likewise the absolute potentials between one of the intermediate electrodes and a reference potential, such as ground potential, caused by the primary and auxiliary currents are separately measured.

Assuming constant intensity current emission from the first electrode, the resistivity value is derived from the four potential measurements and is proportional to the sum of said two absolute potentials after correcting one of said potentials by a factor proportional to the ratio of said two relative potentials. If the primary current is not of constant intensity, the derived value may be divided by a quantity proportional to the current to render the resistivity value independent of the intensity of the primary current.

The electrode array is preferably though not necessarily made symmetrical about the first electrode by the addition of further electrodes corresponding to the intermediate electrodes and the second electrode, respectively, placed in corresponding positions on the opposite side of the first electrode and electrically connected to form symmetrical pairs of electrodes. In other embodiments of the invention, the relative positions of the current-emitting electrodes and potential measuring electrodes in the array may be transposed.

The invention will be more fully understood from the following detailed description and by reference to the accompanying drawings in which.

Figures 1, 1A, 1B, 1C:
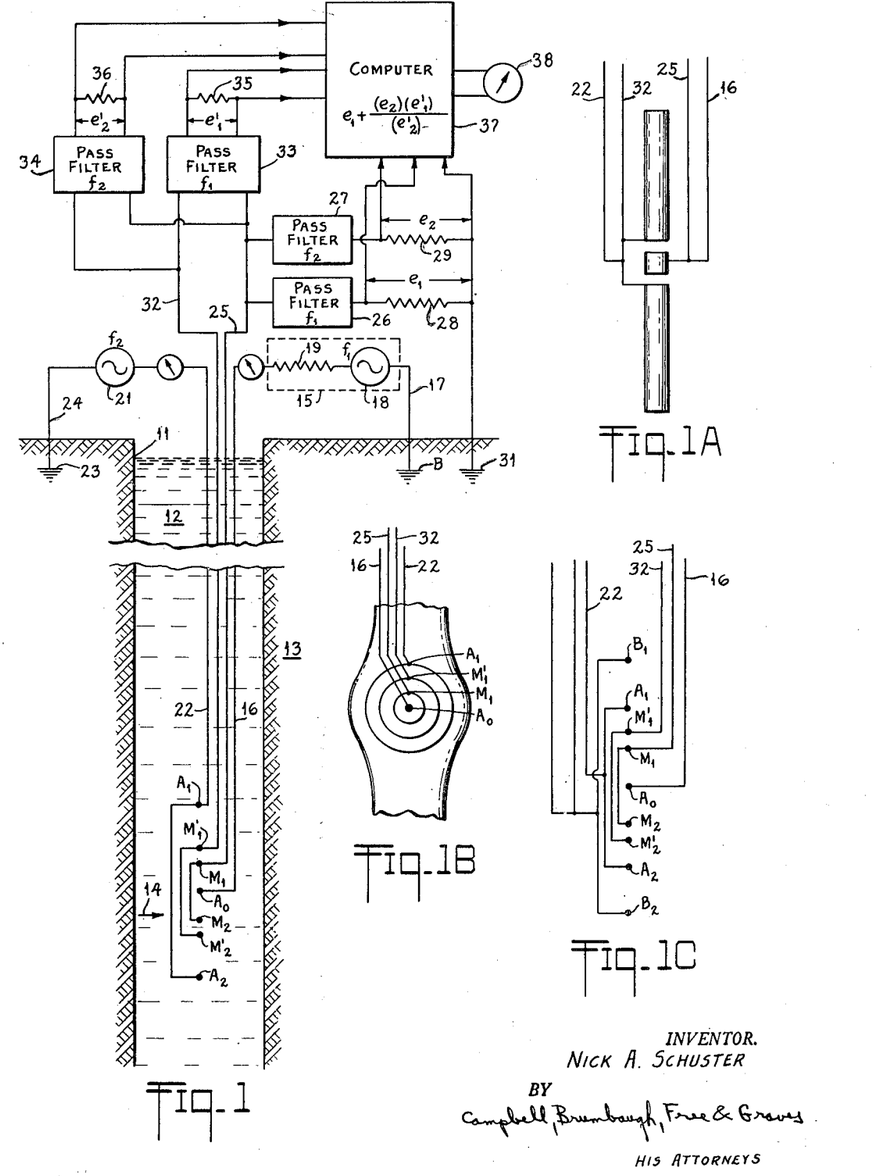
Fig. 1 is a schematic diagram of one of the electrical logging electrode arrays disclosed in the aforementioned application Serial No. 161,641, coupled to a circuit for obtaining resistivity indications in accordance with the present invention.
Figs. 1A, 1B and 1C are schematic diagrams of electrode arrays as disclosed in applications Serial No. 211,788, Serial No. 214,273 and Serial No. 257,348, respectively, which may be employed in accordance with the present invention.

In Fig. 1 a borehole 11 containing electrically conductive drilling liquid 12 traverses a plurality of earth formations 13. An electrode array 14, which may, for example, be arranged in accordance with the principles set forth in the aforementioned copending application Serial No. 161,641, comprises a central electrode $A_0$, intermediate pairs of conductively interconnected electrodes $M_1$ and $M_2$, and $M_1'$ and $M_2'$, respectively, and conductively interconnected exterior electrodes $A_1$ and $A_2$. The electrode array 14 may be passed through the borehole by means of a conventional winch and cable combination (not shown).

Electrical current from a source 15 located outside the borehole 11 is transmitted over an insulated conductor 16 down the borehole to the electrode $A_0$ from which it is emitted. This current flows into and through the formation 13 to an electrode B at a reference potential. The circuit is completed by a conductor 17 which connects to the low potential terminal of the source 15. The current passing between the electrode $A_0$ and the electrode B is preferably of constant intensity, and the source 15 may comprise, for example, the well-known combination of a constant-voltage generator 18 in series with a high impedance 19.

Auxiliary current from a source 21 is transmitted over an insulated cable conductor 22 to the electrodes $A_1$, $A_2$. The auxiliary current passes by way of the earth formations and/or the conductive drilling liquid 12 to a point 23 at a reference potential and is returned to the low potential terminal of the source 21 by a conductor 24.

The primary and auxiliary currents flowing from the electrodes $A_0$ and $A_1$, $A_2$, respectively, create potentials at electrodes $M_1$, $M_2$ and $M_1'$, $M_2'$. In order to distinguish between the potentials caused by the primary and auxiliary currents the source 15 may supply current at a frequency $f_1$ and the source 21 may supply current at a different frequency $f_2$. It is to be understood that either of these frequencies may be zero, that is, one of the currents may be unidirectional. Alternatively, the sources 15 and 21 may supply current either at the same alternating frequency or direct current but during alternate intervals with the result that the currents are capable of time separation.

In the particular apparatus of Fig. 1, the primary current at the frequency $f_1$ emitted from the electrode $A_0$ creates a potential difference $e_1$ at the frequency $f_1$ between the electrodes $M_1$, $M_2$ and a point of reference potential, e. g., ground potential. A corresponding potential difference $e_2$ at the frequency $f_2$ is caused by the auxiliary current at the frequency $f_2$. Further, potential differences $e_1'$ and $e_2'$ at the frequencies $f_1$ and $f_2$, respectively, appear between the interconnected electrodes $M_1$, $M_2$ and the interconnected electrodes $M_1'$, $M_2'$. These four potentials may be separated by any convenient means and applied to a computer 37. For example, an insulated cable conductor 25 is connected to the electrodes $M_1$, $M_2$ and applies the potential appearing thereon to a filter 26 which is adapted to transmit the frequency $f_1$ and reject the frequency $f_2$ and to a filter 27 which is adapted to transmit the frequency $f_2$ and reject the frequency $f_1$. High impedance loads 28 and 29 are connected between the output terminals of the filters 26 and 27, respectively, and a point 31 at a reference potential. This circuit arrangement results in reproducing the potential differences $e_1$ and $e_2$ across the impedances 28 and 29, respectively.

The potentials appearing on the electrodes $M_1'$, $M_2'$ are transmitted out of the borehole 11 by means of an insulated cable conductor 32. Potential differences $e_1'$ and $e_2'$ corresponding to the potential drop between the electrodes $M_1$, $M_2$ and $M_1'$, $M_2'$ at the frequencies $f_1$ and $f_2$, respectively, are separated by filters 33 and 34, respectively, connected across the cable conductors 25 and 32. The filters 33 and 34 are similar to the filters 26 and 27, respectively. The potential differences $e_1'$ and $e_2'$ appear across high impedance loads 35 and 36, respectively, coupled to the output terminals of the filters 33 and 34, respectively.

Each of the potential differences $e_1$, $e_2$, $e_1'$ and $e_2'$ taken separately represents a conventional electrical resistivity logging signal, that is, the potentials $e_1$ and $e_2$ are "normal" signals for current passing from the electrodes $A_0$ and $A_1$, $A_2$, respectively, and the potentials $e_1'$ and $e_2'$ are "inverse" signals of the same currents, respectively. I have, however, discovered a relationship between these voltages that permits their combination in a manner such as to give the same indication as if the current from the electrode $A_0$ were actually being forced into the formations in a path predetermined in accordance with the methods and apparatus disclosed in application Serial No. 161,641. This relation is as follows:

$$R \alpha e_1 + \frac{(e_2)(e_1')}{(e_2')} \qquad (1)$$

where R is a resistivity value substantially proportional to that obtainable in accordance with said application and where $e_1$, $e_1'$, $e_2$ and $e_2'$ are the magnitudes of the four measured potentials. Thus assuming positive current flow from the electrodes $A_0$ and $A_1$, $A_2$, the potentials $e_1$, $e_2$ and $e_1'$ are positive and the potential $e_2'$ is negative. In accordance with the present invention the potentials appearing across the impedances 28, 29, 35 and 36, rectified if desired, may be applied to an electronic or electromechanical computer circuit 37 that yields an output signal proportional to the resistivity R in accordance with the relation (1) above. The output signal is preferably recorded in a conventional manner by an instrument 38 as a function of the depth of the electrode array 14 in the borehole 11.

The resistivity of formation material in an even more confined path may be obtained, under certain circumstances, by solving the relation:

$$R \alpha e_1 + K \frac{(e_2)(e_1')}{(e_2')} \qquad (2)$$

where K is a constant greater than one. The resistivity indication obtained in accordance with relation (2) will be substantially the same as those obtainable in accordance with the aforementioned application Serial No. 161,641 when the auxiliary current from the electrodes $A_1$, $A_2$ is increased beyond the value necessary to reduce the potential difference between the electrodes $M_1$, $M_2$ and $M_1'$, $M_2'$ to zero. In the description of a suitable computer, the relation (1) is discussed. However, the relation (2) may be employed by merely introducing the factor K when adding the two terms of the relation (1).

In lieu of the electrode array 14 shown in Fig. 1 any of the electrode arrays shown in the aforementioned copending applications Serial No. 211,788, No. 214,273, or No. 257,348 may be employed, as shown, for example, in Figs. 1A, 1B and 1C where similar reference characters apply to similar elements.

Figure 2:
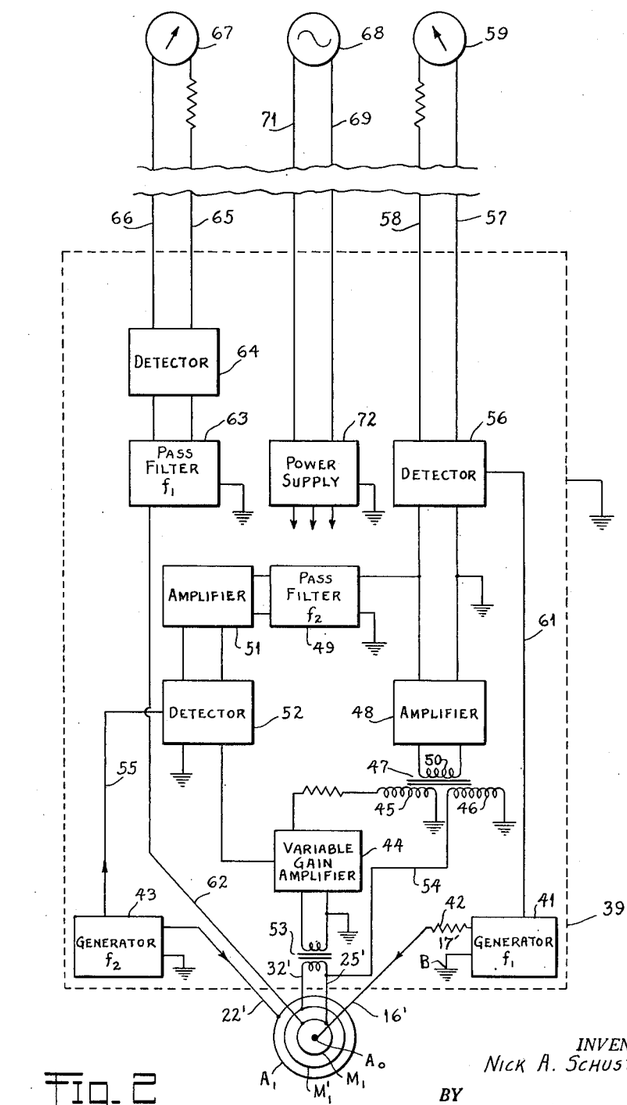
Fig. 2 is a circuit diagram of a computer suitable for obtaining highly effective electrical logging resistivity indications, in accordance with the present invention.

A preferred form of the computer 37 is disclosed in Fig. 2 and may be employed, for example, with any of the electrode arrays disclosed in connection with Fig. 1. In Fig. 2, the computer is connected with the electrode array shown in Fig. 1B. The computer may be at the surface of the earth or in a pressure-resistant housing 39 adapted to pass through the borehole with the electrode array. A constant-frequency generator 41 is adapted to supply preferably constant current at the frequency $f_1$ to the center electrode $A_0$ through a high impedance 42 and an insulated conductor 16'. The low impedance terminal of the generator 41 is connected by a conductor 17' to the ground electrode B which may, for example, be on the exterior of the housing 39. A second generator 43 is adapted to supply current at the frequency $f_2$ to the outer electrode $A_1$ over a conductor 22'. Accordingly, between electrodes $M_1$ and $M_1'$ there exists a potential difference $e_1'$ at the frequency $f_1$ and a potential difference $e_2'$ at the frequency $f_2$. Between electrode $M_1$ and ground there exists a potential difference $e_1$ at the frequency $f_1$ and potential difference $e_2$ at the frequency $f_2$. Taking the electrode $M_1$ as a reference point, the phase or polarity of the potential $e_2'$ is opposite or negative that of the potential $e_2$, while the potential $e_1'$ will be of like phase or polarity with the potential $e_1$.

The relation (1), which combines the potential differences $e_1$, $e_2$, $e_1'$ and $e_2'$ to provide a potential R more nearly proportional to the formation resistivity, is derived by means of a variable gain amplifier 44 whose overall gain G is controlled in accordance with the difference between the voltage appearing across primary windings 45 and 46 of a transformer 47 through the action of a feedback loop comprising an amplifier 48, a filter 49, a further amplifier 51 and a detector 52 connected in series. The potential differences $e_1'$ and $e_2'$ are supplied through an isolation transformer 53 to the input of the variable gain amplifier 44. The primary winding 45 of the transformer 47 is connected in the output circuit of the amplifier 44. The primary winding 46 of the transformer 47 is connected between ground and the electrode $M_1$ by means of conductors 54 and 25' with the result that the potentials $e_1$ and $e_2$ appear across the winding 46 in algebraic addition to the output signals $Ge_1'$ and $Ge_2'$ of the variable gain amplifier that are impressed on the winding 45. The potentials $e_1$ and $e_2$ may be obtained from the electrode $M_1'$, if desired, without changing the resistivity value subsequently computed.

Insofar as the frequency $f_2$ is concerned, the combined signal applied to the amplifier 48 by means of a secondary winding 50 of the transformer 47 is proportional to $e_2 - Ge_2'$, since $e_2'$ is negative. This signal is transmitted by the filter 49 which substantially eliminates signals of the frequency $f_1$. The filtered signal is amplified in the amplifier 51 and rectified in the detector 52, which is preferably made phase-sensitive to the frequency $f_2$ by applying a reference potential of the same frequency from the generator 43 over a conductor 55. A direct potential proportional to $e_2 - Ge_2'$ is applied to the gain control circuits of the amplifier 44 with such polarity as to tend to cancel the combined signal of the frequency $f_2$ applied to the amplifier 48. This causes the potential $Ge_2'$ across the winding 45 to be equal to the potential $e_2$ across the winding 46. Accordingly, the gain G of the variable gain amplifier 44 will be continuously equal to $$\frac{e_2}{e_2'}$$

The variable gain amplifier 44 must be constructed to have a gain at the frequency $f_1$ that is proportional to the gain at the frequency $f_2$. Specifically, the proportionality factor must be K to satisfy the relation (2) and unity to satisfy the relation (1). With this gain equal to $$\frac{e_2}{e_2'}$$

consider now the effect of current of the frequency $f_1$ on the computer circuit. The signal applied across the winding 46 will be equal to $e_1$, and the signal applied across the winding 45 will be equal to $Ge_1'$. Thus the signal at the input of the amplifier 48 will be continuously proportional to the algebraic sum of the two signals or $e_1 + Ge_1'$. Since $$G = \frac{e_2}{e_2'}$$

the signal applied to the amplifier 48 is made continuously proportional to $$e_1 + \left(\frac{e_2}{e_2'}\right)e_1'$$

which is the same as relation (1) above. Thus since signals of the frequency $f_2$ are substantially eliminated, the output signal from the amplifier 48 is a potential of the frequency $f_1$ which is substantially the same as the potential measured in accordance with the aforementioned Doll copending application Serial No. 214,273, and is thus proportional to the resistivity of formation material in a predetermined path, though current of neither the frequency $f_1$ nor the frequency $f_2$ is confined to this path.

The output signal from the amplifier 48 may be applied to a linear detector 56 through a filter passing only the frequency $f_1$, if desired. The detected voltage may be sent to the surface of the earth by means of insulated cable conductors 57 and 58 to a high impedance recording galvanometer 59 which preferably makes a record of the resistivity R as a function of the depth of the electrode array in the borehole. The detector 56 is preferably made phase selective by the insertion of a reference potential at the frequency $f_1$ applied over a conductor 61 from the generator 41.

If desired, simultaneously with the measurement of R there may be obtained one or more resistivity measurements representative of shorter depths of investigation in accordance with the disclosures in copending application Serial No. 122,102, entitled "Resistivity Method and Apparatus for Obtaining Indications of Permeable Formations Traversed by a Borehole" and filed October 18, 1949, now U. S. Patent No. 2,669,690, issued February 16, 1954, in the name of Henri-Georges Doll, or in the aforementioned application Serial No. 214,273. For this purpose a conductor 62 may be connected from the electrode $M_1$ to a filter 63 which transmits only current at the frequency $f_1$. Potential differences of the frequency $f_1$ between the electrode $M_1$ and ground are applied to a detector 64 connected to the output of the filter 63. The detected signal may be sent to the surface of the earth through insulated conductors 65 and 66 where the resistivity values may be recorded on a high impedance galvanometer 67. All of the electrical power necessary to operate the electronic equipment in the housing 39, may, for example, be supplied by an alternating voltage generator 68 at the surface of the earth through insulated conductors 69 and 71 to a conventional power supply 72.

Figure 3:
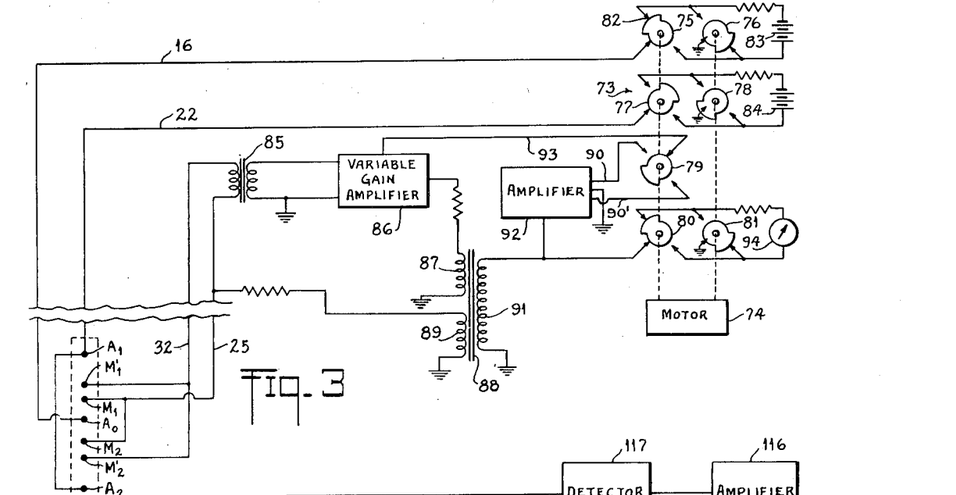
Fig. 3 is a circuit diagram of a modification of the logging system shown in Fig. 2.

The embodiment shown in Fig. 2 operates on a frequency separation basis. As mentioned above, the invention is applicable to time separation methods and the computing apparatus disclosed in connection with Fig. 2 is readily adaptable thereto. In Fig. 3 the electrode array may, for example, be the same as that shown in Fig. 1, and this embodiment will be described in connection with an electrode array constructed in accordance with the aforementioned copending application Serial No. 161,641 though any of the electrode arrays disclosed in the other copending applications may be employed, if desired.

In Fig. 3 a rotary switch 73 driven by motive means 74, such as an electric motor, controls the operational sequence of the resistivity computer to generate and detect four significant potentials which are combined to yield a single resultant signal indicative of the desired resistivity measurement. The switch 73 is illustrated as comprising a plurality of conductive wafers 75–81 which make continuous or intermittent sliding connection with face-wiping resilient contact arms, such as a contact arm 82. The wafers are mounted on and insulated from a common shaft which simultaneously rotates the same.

The switch wafers 75 and 76 are adapted to supply between the electrode $A_0$ and the grounded electrode B a current of alternate polarity during alternate quarter cycles of the switch 73 from a direct current source 83. During the intermediate quarter cycles the switch wafers 77 and 78 are adapted to supply a current of alternate polarity between the electrodes $A_1$, $A_2$ and ground potential from a direct current source 84.

The conductors 25 and 32 from the electrodes $M_1$, $M_2$ and $M_1'$, $M_2'$, respectively, are connected to an isolation transformer 85, the secondary winding of which is connected across the input of a variable gain amplifier 86 similar to the amplifier 44 of Fig. 2. During alternate quarter cycles potentials equal to $e_1'$ and $e_2'$ are applied to the amplifier 86, and the amplified signal is supplied to a primary winding 87 of a transformer 88. The transformer 88 corresponds to the transformer 47 of Fig. 2 and includes a further primary winding 89 across which potentials equal to $e_1$ and $e_2$ are applied during alternate quarter cycles. During even quarter cycles a potential proportional to $e_1+Ge_1'$ and during odd quarter cycles a potential proportional to $e_2-Ge_2'$ appears across the secondary winding 91 of the transformer 88.

The secondary winding 91 is connected both to the input of an amplifier 92 and to the switch wafer 80. The output circuit of the amplifier 92 is balanced with respect to ground and provides two output conductors 90 and 90' on which the output signals appear with opposite polarity. The conductors 90 and 90' are alternately connected to a switch wafer 79 which applies a rectified control potential over a lead 93 to the gain control circuit of the amplifier 86 only during the odd quarter cycles. The gain G of the amplifier 86 is accordingly made substantially equal to $$\frac{e_2}{e_2'}$$

and the control circuit has sufficient time delay to maintain this gain unchanged during the even quarter cycles when $e_1'$ is being applied to the amplifier 86.

The switch wafers 80 and 81 serve to supply a rectified signal to a meter 94 only during the even quarter cycles. It is thus observed that a direct potential proportional to the relation (1) above may be continuously recorded by the meter 94 as a function of the depth of the electrode array in the borehole.

It will be obvious to those skilled in the art that the present invention can be employed for obtaining a plurality of resistivity indications, each representative of a different effective current path of predetermined shape of the types disclosed, for example, in the aforementioned copending application Serial No. 257,348. To accomplish this result a plurality of separable frequencies may be employed, two for each measurement of resistivity along a given predetermined path. Alternatively, of course, time separation may be readily employed.

Figure 4:
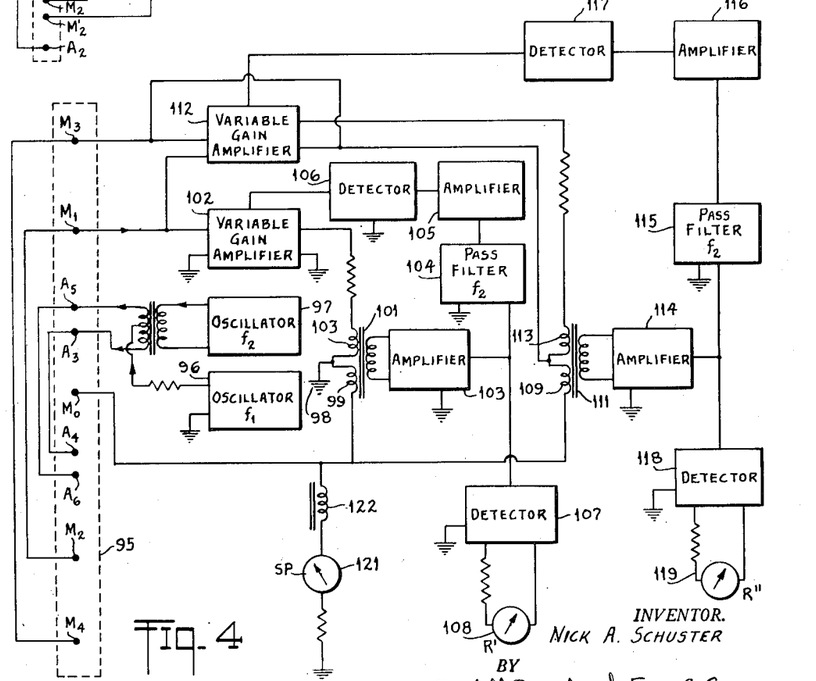
Fig. 4 is a circuit diagram of a further modification of an electrical resistivity logging system in accordance with the invention.

The invention may also be employed for obtaining resistivity indications equivalent to those obtainable in accordance with copending application Serial No. 282,579 filed April 16, 1952, now U. S. Patent No. 2,712,631, issued July 5, 1955, in the name of Maurice Ferre, and entitled "Electrical Well Logging," as shown, for example, in Fig. 4. Fig. 4 is a circuit diagram of a modification of the invention for obtaining a plurality of resistivity indications, each indicative of the resistivity along different paths through the formations. An electrode array 95 may comprise a center electrode $M_0$ and conductively interconnected pairs of electrodes $A_3$ and $A_4$, $A_5$ and $A_6$, $M_1$ and $M_2$, and $M_3$ and $M_4$. Constant-intensity current of the frequency $f_1$ is supplied from an oscillator 96 between the electrodes $A_3$, $A_5$, $A_4$, $A_6$ and ground potential. Current of the frequency $f_2$ is supplied from an oscillator 97 between the electrodes $A_3$ and $A_5$ and between $A_4$ and $A_6$.

Signals $E_1$ and $E_2$ corresponding to the potential differences at the frequencies $f_1$ and $f_2$, respectively, between the electrode $M_0$ and a point 98 at ground potential are applied across a primary winding 99 of a transformer 101. Signals corresponding to the potentials between the electrodes $M_1$, $M_2$ and ground potential are supplied to the input of an amplifier 102 having a variable gain G. These potentials may be termed $E_1'$ and $E_2'$ at the frequencies $f_1$ and $f_2$, respectively. After amplification, the potentials $GE_1'$ and $GE_2'$ are applied to a further primary winding 103 of the transformer 101, which winding acts in algebraic addition to the winding 99. The output of the transformer 101 is connected to a fixed gain amplifier 103. The amplifier 103 acts through a filter 104 which rejects the frequency $f_1$, a further amplifier 105 and a detector 106 to control the gain of the variable gain amplifier 102 in substantially the same manner as the amplifier 44 is controlled in the apparatus of Fig. 2. Accordingly, the gain G of the amplifier 102 is maintained equal to the ratio of $E_2:E_2'$. A detector 107 is connected to the output of the amplifier 103 and supplies a signal to a recording galvanometer 108 corresponding to a resistivity R' having substantially the same significance as the measurement obtained in accordance with the above-mentioned copending application Serial No. 161,641 and Serial No. 282,579.

Simultaneously, signals corresponding to the potential between the electrode $M_0$ and the electrodes $M_3$, $M_4$ at the frequencies $f_1$ and $f_2$, respectively, are applied to a primary winding 109 of a transformer 111. Signals corresponding to the potentials between the electrodes $M_1$, $M_2$ and $M_3$, $M_4$ at the frequencies $f_1$ and $f_2$, respectively, are applied to the input of a further variable gain amplifier 112, the output of which is connected to another primary winding 113 of the transformer 111, which winding acts in opposition to the winding 109. An amplifier 114 similar to the amplifier 103 is connected to the output of the transformer 111. A filter 115 which rejects the frequency $f_1$, an amplifier 116 and a detector 117 serve to couple the output of the amplifier 114 to the gain control circuit of the amplifier 112. The gain of the amplifier 112 is consequently automatically controlled in the manner previously discussed with the result that the signal available at the output of the amplifier 114 is proportional to the resistivity of R" having substantially the same significance as in the above-mentioned copending applications Serial No. 257,348 and Serial No. 282,579. This signal may be rectified by a detector 118 and indicated by a high impedance galvanometer 119.

If neither the frequency $f_1$ nor $f_2$ is zero, a spontaneous potential measurement may be simultaneously obtained between the electrode $M_0$ and ground potential by means of a high impedance recording galvanometer 121 which is isolated from the alternating currents by a choke coil 122.

Figure 5:
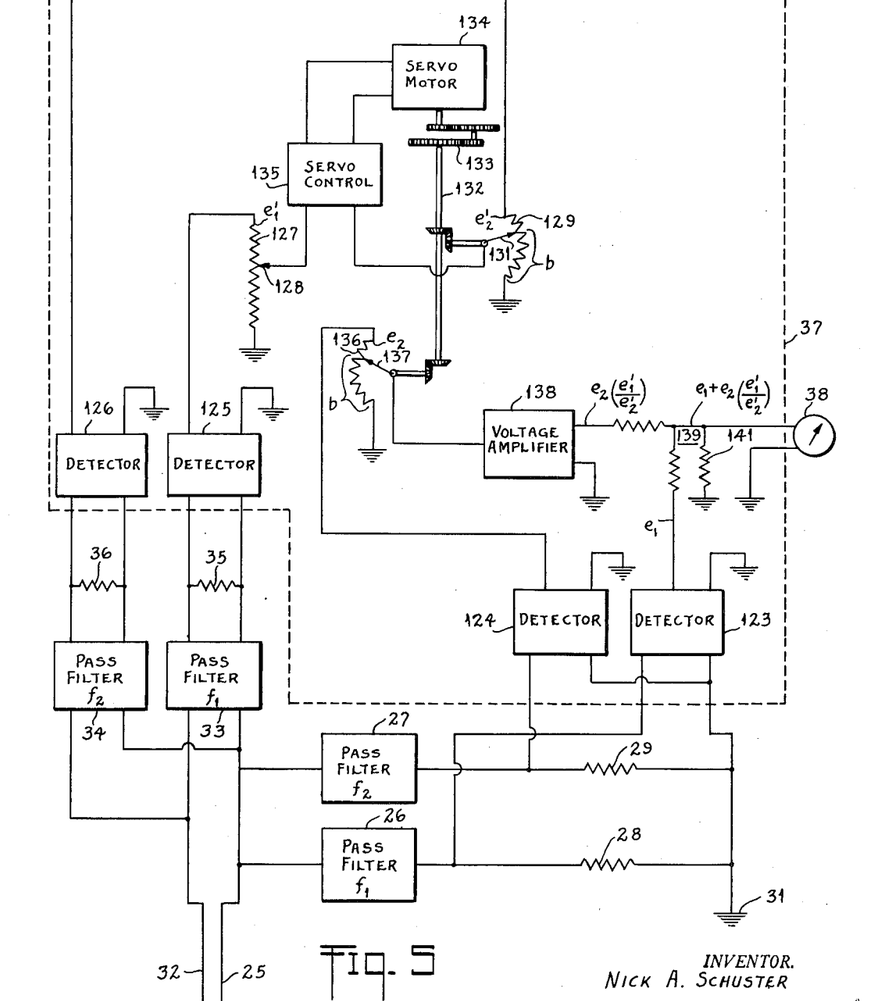
Fig. 5 is a circuit diagram of an alternative form of computer suitable for use with any one of the electrode arrays illustrated in Figs. 1, 1A, 1B or 1C.

Fig. 5 shows an electromechanical type of computer 37 which may be employed in the well logging system of Fig. 1. The computer 37 may be constructed according to the principles disclosed in copending application Serial No. 293,146, entitled "Electromechanical Computers" and filed June 12, 1952, now U. S. Patent No. 2,726,365, issued December 6, 1955, in the name of Kenneth A. Bilderback. The potentials $e_1$, $e_2$, $e_1'$ and $e_2'$ appearing across the resistors 28, 29, 35 and 36, respectively, may be converted to direct voltages by the operation of detectors 123, 124, 125 and 126, respectively. In the computer 37 the rectified output signal from the detector 125 is applied across a voltage divider 127 with the result that a potential proportional to $e_1'$ appears between a movable contact 128 and ground. The output signal from the detector 126 is applied to a voltage divider 129 having a movable contact 131 which is mechanically controlled by a shaft 132 driven through reduction gearing 133 by a servo motor 134. The contact 131 is electrically connected to the input of a servo control amplifier 135 to which the contact 128 on the voltage divider 127 is also connected.

The potential on the contact arm 131 is equal to $be_2'$ where "b" represents the variable fraction of the total resistance of the voltage divider 129 between the arm 131 and ground. The algebraic sum of the two potentials applied to the servo control amplifier 135 is proportional to $e_1'-be_2'$, having in mind that $e_2'$ is negative. A voltage corresponding to this quantity is employed as an error signal to control the direction and speed of rotation of the servo motor 134. When the error signal becomes substantially zero, the shaft 132 has moved the contact arm 131 to a position such that $b$ is proportional to the ratio $$\frac{e_1'}{e_2'}$$

A further voltage divider 136 is provided having a movable contact arm 137 geared to the shaft 132 with the result that the contact arm 137 reproduces the position of the contact arm 131 and a potential applied to the voltage divider 136 is multiplied by the fraction $b$. The output signal from the detector 124 is supplied to the voltage divider 136; consequently the potential appearing on the contact arm 137 is proportional to $be_2$ or $$\frac{(e_2)(e_1')}{(e_2')}$$

This voltage is amplified in an amplifier 138 and added in a resistor network 139 to the output from the detector 123 to provide a voltage across a resistor 141 that is proportional to R in accordance with the relations (1) or (2) previously discussed. This voltage is indicated by the indicator 38.

As a practical matter, the ratio $$\frac{e_1'}{e_2'}$$

will, in general, be greater than unity. For example, if the current emitted by the electrode $A_0$ is 1 milliampere and the current from the electrodes $A_1$, $A_2$ is 100 milliamperes, the potential ratio may exceed unity under certain conditions but will normally never be greater than a given factor, for example, 10. In order to deal with this condition, the contact 128 on the voltage divider 127 may be positioned to reduce the potential $e_1'$ by a factor of 10 and the input to the amplifier 138 increased by this same factor by suitably adjusting the gain of the amplifier 138.

It is to be understood that the computer for combining the potentials obtained from the borehole may take many forms familiar to those skilled in the design of analogue computers. It is to be kept in mind that the relations (1) and (2) may be mathematically manipulated to change their appearance without altering their equivalence. Accordingly, the apparatus illustrated is exemplary only and is not to be construed as limiting the invention defined in the appended claims.

I claim:

1. In a method of investigating an electrical characteristic of earth formations traversed by a bore hole containing electrically conductive liquid, the steps of creating a first electric field having components directed oppositely along the bore hole and emanating from a first location therein, creating a second separably measurable electric field having components directed oppositely along the bore hole and emanating from each of second and third locations in the bore hole above and below said first location, respectively, picking up first signals representative of the absolute potential with respect to ground of one of said fields at a location in the vicinity of said first location, picking up second and third signals representative, respectively, of the potential gradients along the bore hole in each of said fields in a region near one of said locations, and producing a signal that is a function of the product of said first signal and the ratio of said second and third signals.

2. In a method of investigating an electrical characteristic of earth formations traversed by a bore hole containing electrically conductive liquid, the steps of creating a first electric field having components directed oppositely along the bore hole and emanating from a first location therein, creating a second separably measurable electric field having components directed oppositely along the bore hole and emanating from each of second and third locations in the bore hole above and below said first location, respectively, picking up first and second signals representative, respectively, of the absolute potentials with respect to ground of each of said fields at a location in the vicinity of said first location, picking up third and fourth signals representative, respectively, of the potential gradients along the bore hole in each of said fields in a region near one of said locations, and producing a signal that is a function of the sum of said first signal and the product of said second signal and the ratio of said third and fourth signals.

3. In a method of investigating the electrical resistivity of earth formations traversed by a bore hole containing electrically conductive liquid, the steps of emitting a first electric current between a first location in the bore hole and a remote current return point at ground potential, emitting a second separably different electric current between second and third locations in the bore hole respectively above and below said first location and a remote current return point at ground potential, picking up first and second absolute potentials produced by said first and second currents, respectively, between a potential pickup point in the vicinity of said first location and a reference point at ground potential, picking up third and fourth potential gradients along the bore hole in a region in the vicinity of said first location, and producing a signal that is a function of the sum of said first absolute potential and the product of said second absolute potential and the ratio of said third and fourth potential gradients.

4. A method as defined in claim 3, in which said first and second absolute potentials are picked up between a point near said first location and a reference point at ground potential, and said third and fourth potential gradients are picked up between at least two points near said first location and spaced apart along the bore hole therefrom.

5. A method as defined in claim 3 in which said first and second absolute potentials are picked up between a point at said first location and a reference point at ground potential, and said third and fourth potential gradients are picked up between a first point at said first location and at least one other point at one of said second and third locations.

6. A method as defined in claim 3 in which said first and second currents are restricted to conductive paths leading directly from said first, second and third locations to the adjacent earth formations, from which paths the conductive bore hole liquid is substantially completely excluded, both the potential pickup point and the region in the vicinity of the first location where the third and fourth potential gradients are picked up being in direct electrical communication with the adjacent earth formation but out of direct electrical communication with the conductive bore hole liquid.

7. In a method of investigating the electrical resistivity of earth formations traversed by a bore hole containing electrically conductive liquid, the steps of emitting a first electric current between each of first and second locations spaced equal distances above and below a reference datum in the bore hole and a point at ground potential, emitting a second separably different electric current between each of said first and second locations and each of third and fourth locations in the vicinities of said first and second locations, respectively, and spaced different equal distances above and below said reference datum, picking up first and second potential differences produced by said first and second currents, respectively, between a point at said reference datum and a point at ground potential, picking up third and fourth potential differences produced by said first and second currents, respectively, between a reference point and at least one point spaced along the bore hole a greater distance from said reference datum than any of said current emitting locations, and producing a signal that is a function of the sum of said first potential difference and the product of said second potential difference and the ratio of said third and fourth potential differences.

8. In a method of investigating an electrical characteristic of earth formations traversed by a bore hole containing an electrically conductive liquid in which exists a first electric field having a component in the direction of the bore hole, the steps of creating a second separably measurable electric field having components directed oppositely along the bore hole and emanating from a location in the bore hole, said oppositely directed components and said location being in a region of the bore hole where said bore hole component of the first field is also present, picking up first signals representative of the absolute potential with respect to ground of said first field at a point in the vicinity of said location, picking up second and third signals representative, respectively, of the potential gradients along the bore hole in each of said fields in a region near said location, and producing a signal that is a function of the product of said first signal and the ratio of said second and third signals.

9. In a method of investigating an electrical characteristic of earth formations traversed by a bore hole containing an electrically conductive liquid in which exists a first electric field having a component in the direction of the bore hole, the steps of creating a second separably measurable electric field having components directed oppositely along the bore hole and emanating from each of two nearby locations spaced apart along the bore hole and encompassing a region in which the bore hole component of said first field is also present, picking up first and second signals representative of the absolute potentials with respect to ground in said respective fields at a point intermediate said two locations, picking up third and fourth signals, representative, respectively, of the potential gradients along the bore hole of said first and second fields in a region intermediate said two locations, and producing a signal that is a function of the sum of said first signal and the product of said second signal and the ratio of said third and fourth signals.

10. In apparatus for investigating the electrical resistivity of earth formations traversed by a bore hole containing an electrically conductive liquid, the combination of a source of primary current, a source of separably different secondary current, a first electrode mounted for movement through the bore hole, second and third electrode means mounted above and below said first electrode for movement through the bore hole therewith, first circuit means connecting said primary current source to said first electrode to cause the latter to emit a first current having components directed oppositely along the bore hole, second circuit means connecting said secondary current source to said second and third electrode means to cause each of the latter to emit a second separably different current having components directed oppositely along the bore hole, means for picking up first and second signals representative, respectively, of the absolute potentials produced by said first and second currents at a location in the vicinity of said first electrode and fixed in relation thereto, means for picking up third and fourth signals representative, respectively, of the potential gradients along the bore hole produced by said first and second currents in a region near at least one of said electrode means, and computer means responsive to said first, second, third and fourth signals for producing a signal that is a function of the sum of said first signal and the product of said second signal and the ratio of said third and fourth signals.

11. In apparatus for investigating the electrical resistivity of earth formations traversed by a bore hole containing an electrically conductive liquid, the combination of a source of primary current, a source of separably different secondary current, a first electrode mounted for movement through the bore hole, second and third electrode means mounted above and below said first electrode for movement through the bore hole therewith, first circuit means connecting said primary current source to said first electrode and to a remote point at ground potential to cause said first electrode to emit a first current having components directed oppositely along the bore hole, second circuit means connecting said secondary source to said second and third electrode means and to a remote point at ground potential to cause said second and third electrode means to emit a second separably different current having components directed oppositely along the bore hole, means for picking up first and second potential differences produced by said first and second currents between a location in the vicinity of said first electrode and fixed in relation thereto and a reference point at ground potential, means for picking up third and fourth potential gradients along the bore hole produced by said first and second currents in a region near said first electrode, and computer means responsive to said first and second potential differences, and third and fourth potential gradients for producing a signal that is a function of the sum of said first potential difference and the product of said second potential difference and the ratio of said third and fourth potential gradients.

12. Bore hole investigating apparatus as in claim 11 in which the first electrode and the second and third electrode means are mounted in one face of an electrically insulating pad which is maintained against the side wall of the bore hole, the means for picking up the first and second potential differences includes a potential pickup electrode also mounted in said face of the pad in nearby spaced relation to said first electrode, and the means for picking up the third and fourth potential gradients includes said potential pickup electrode and another potential pickup electrode also mounted in said face of the pad in different nearby spaced relation to said first electrode.

13. In apparatus for investigating the electrical resistivity of earth formations traversed by a bore hole containing an electrically conductive liquid, the combination of a source of primary current, a source of separably different secondary current, an electrode array including a first electrode mounted for movement through the bore hole, second and third electrodes mounted equal distances above and below said first electrode, respectively, fourth and fifth electrodes mounted greater equal distances above and below said first electrode, respectively, and sixth and seventh electrodes mounted still greater equal distances above and below said first electrode, respectively, first circuit means connecting said primary source to a reference point at ground potential and to at least said second and third electrodes, second circuit means connecting one terminal of said secondary source to said second and third electrodes and the other terminal of said secondary source to said fourth and fifth electrodes, and computer means connected to receive first and second potential differences produced by said first and second currents between said first electrode and a reference point at ground potential, and third and fourth potential differences between at least one of said sixth and seventh electrodes and a reference point for producing a signal that is a function of the sum of said first potential difference and the product of said second potential difference and the ratio of said third and fourth potential differences.

14. Well logging apparatus comprising a first electrode adapted to be moved through a well, a first source of electrical energy connected between said first electrode and a point remote therefrom to supply current to said first electrode, electrode means disposed symmetrically above and below said first electrode in constant spatial relation thereto, a second source of electrical energy connected between said electrode means and a point remote therefrom to supply separably different current to said electrode means, means for separately picking up first and second potential differences created by said first and second current sources, respectively, between said first electrode and a point remote therefrom at ground potential, means for separately picking up third and fourth potential differences created by said first and second current sources, respectively, between said electrode means and said first electrode, and computer means responsive to all of said potential differences for producing a signal representative of formation resistivity proportional to the algebraic sum of the first potential difference and a correction factor, said correction factor being proportional to the product of the ratio of said second and fourth potential differences and said third potential difference.

References Cited in the file of this patent

UNITED STATES PATENTS

| | | |
|---|---|---|
| 2,211,125 | Jokowky | Aug. 13, 1940 |
| 2,354,535 | Muffly | July 25, 1944 |
| 2,357,177 | Doll | Aug. 29, 1944 |
| 2,357,178 | Doll | Aug. 29, 1944 |
| 2,364,159 | Muffly | Dec. 5, 1944 |
| 2,592,101 | Aiken | Apr. 1, 1952 |